(12) United States Patent
Waltermann et al.

(10) Patent No.: US 7,774,829 B2
(45) Date of Patent: Aug. 10, 2010

(54) COMPUTER ACCESS CONTROL USING PASSWORD RESET

(75) Inventors: Rod D. Waltermann, Rougemont, NC (US); Mark Charles Davis, Durham, NC (US); Scott Edward Kelso, Durham, NC (US); John Carl Mese, Cary, NC (US); Nathan J. Peterson, Raleigh, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1072 days.

(21) Appl. No.: 11/472,493

(22) Filed: Jun. 20, 2006

(65) Prior Publication Data

US 2008/0022393 A1     Jan. 24, 2008

(51) Int. Cl.
*H04L 9/32*    (2006.01)
*G06F 21/00*   (2006.01)

(52) U.S. Cl. .................................. 726/6; 713/2; 726/18
(58) Field of Classification Search ................... 726/17, 726/18, 5, 6, 7, 19; 713/2, 150–194, 1, 10; 705/56
See application file for complete search history.

(56) References Cited

U.S. PATENT DOCUMENTS

| | | | |
|---|---|---|---|
| 4,959,860 A * | 9/1990 | Watters et al. ................ 726/19 |
| 5,892,906 A * | 4/1999 | Chou et al. .................... 726/19 |
| 5,918,007 A | 6/1999 | Blackledge et al. |
| 6,263,431 B1 * | 7/2001 | Lovelace et al. ............... 713/2 |
| 6,615,356 B1 | 9/2003 | Byun |
| 6,725,382 B1 * | 4/2004 | Thompson et al. ............ 726/19 |
| 6,871,286 B1 * | 3/2005 | Cagle et al. .................... 726/5 |
| 6,990,684 B2 * | 1/2006 | Futamura et al. .............. 726/18 |
| 7,178,025 B2 * | 2/2007 | Scheidt et al. ............... 713/168 |
| 7,185,193 B2 * | 2/2007 | Watanabe et al. ........... 713/155 |
| 2001/0002487 A1 * | 5/2001 | Grawrock et al. ........... 713/193 |
| 2003/0188162 A1 * | 10/2003 | Candelore et al. ........... 713/169 |
| 2004/0059907 A1 * | 3/2004 | Cochran et al. ................ 713/2 |
| 2004/0128508 A1 * | 7/2004 | Wheeler et al. ............. 713/170 |

* cited by examiner

*Primary Examiner*—Christopher A Revak
*Assistant Examiner*—Abdullah Almamun
(74) *Attorney, Agent, or Firm*—Ference & Associates LLC

(57) ABSTRACT

The present invention relates to a method for method or system which is able to control access to a new computer user password reset. The system is preloaded with a random password that does not needed to be known by anyone. There are two main situations in which this method will be used. The first situation involves a locally managed password and account where the user does not log in to a domain. The second situation involves remote management, where the user logs in to a domain.

19 Claims, 2 Drawing Sheets

COMPUTER ACCESS CONTROL USING PASSWORD RESET

FIELD OF THE INVENTION

The present invention relates generally to providing access control to a computer using password reset.

BACKGROUND OF THE INVENTION

New computerized devices are typically shipped without any startup passwords. Passwords are added as the system is powered up, or as user information is provided. This provides little to no validation of the recipient's identity, thus allowing for theft. This is problematic, particularly in cases where the computers have been pre-installed with specific proprietary software that should only be available to the intended end-user. A separate power-on password can be dispatched outside the computerized device, but these separate passwords can be intercepted. Thus, this method of validation is also not fail proof.

Further, if a computer has been received by the intended user, but the user forgets the password, there is no known way to reset the password while ensuring the identity of the user. In the current state of the art, at boot time, the BIOS queries for a power-on password. As part of ATAPI standard, computers have implemented a hard disk password as well. Without the input of the correct hard drive password, the drive will not allow any other command to be executed. This is enforced on the hard drive. The BIOS queries the user for the password and passes it through to the hard drive. Using this implementation, if the hard drive is pulled out of its current computer and placed in another system, the drive password does not change, and the hard drive can be accessed by the same user. However, if the password is forgotten, the system is inaccessible.

Thus, there exists a need in the art to control access to a new computer and reset the hardware password. Such a method would ensure that a stolen or misplaced computer could not be improperly used.

SUMMARY OF THE INVENTION

This present invention broadly relates to a method or system which is able to control access to a computer using a hardware password reset.

In summary, one aspect of the invention provides an apparatus for permitting a system password reset for a user in the context of a system, said apparatus comprising an arrangement for recognizing a unique system identifier; an arrangement for accepting user input to compare with the unique system identifier; and an arrangement for permitting a system password reset upon a match involving the user input and the unique system identifier.

Another aspect of the invention provides a method for permitting a system password reset for a user in the context of a system, said method comprising the steps of recognizing a unique system identifier; accepting user input to compare with the unique system identifier; and permitting a system password reset upon a match involving the user input and the unique system identifier.

Furthermore, an additional aspect of the present invention provides a program storage device readable by machine, tangibly embodying a program of instructions executable by the machine to perform method steps permitting a system password reset for a user in the context of a system, said method comprising the steps of providing a unique system identifier; accepting user input to compare with the unique system identifier; and permitting a system password reset upon a match involving the user input and the unique system identifier.

For a better understanding of the present invention, together with other and further features and advantages thereof, reference is made to the following description and the scope of the invention will be pointed out in the appended claims.

DETAILED DESCRIPTION OF THE PREFERRED EMBODIMENTS

Figure 1:
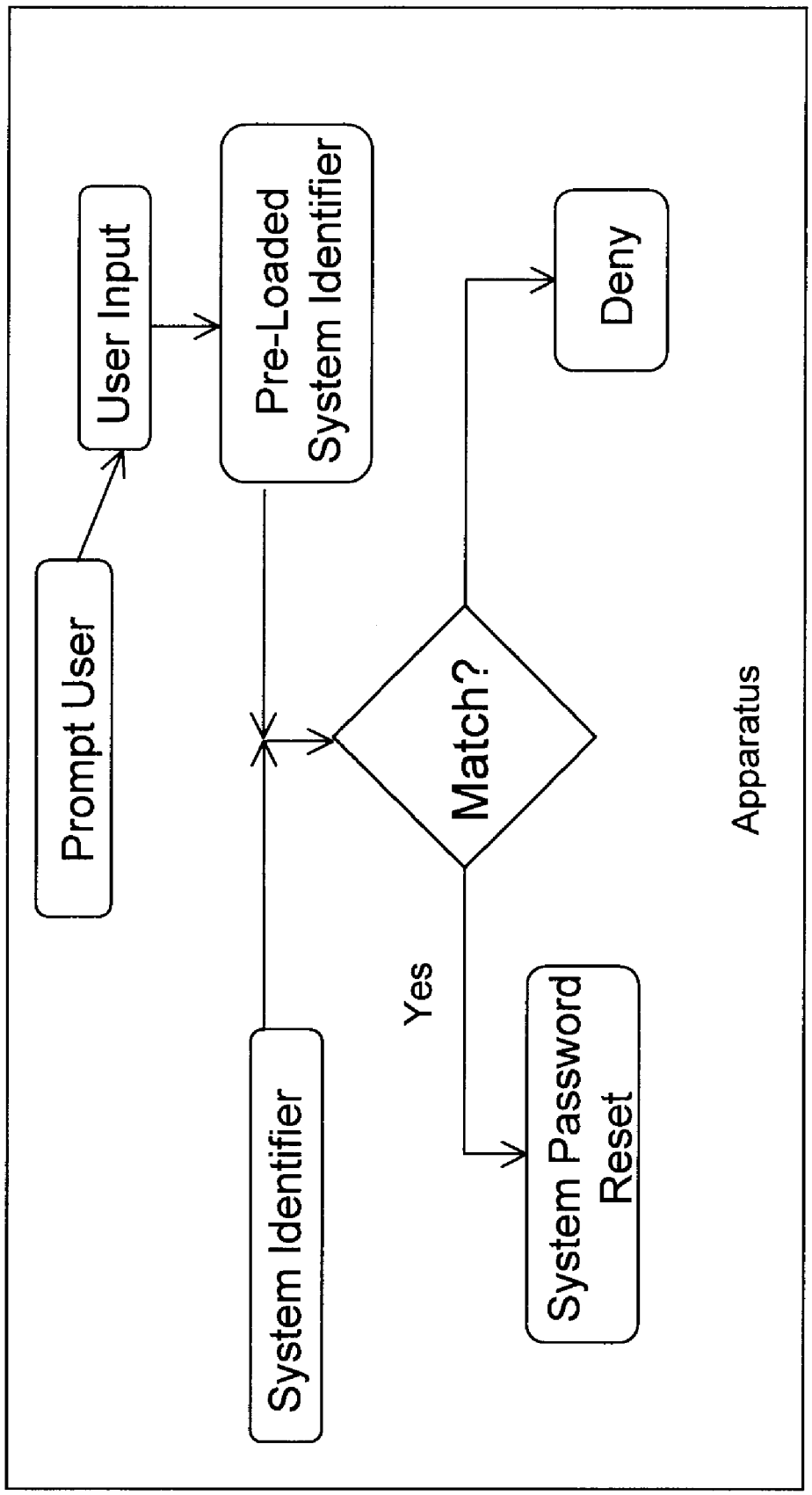
FIG. 1 illustrates password reset according to an embodiment of the invention.
Figure 2:
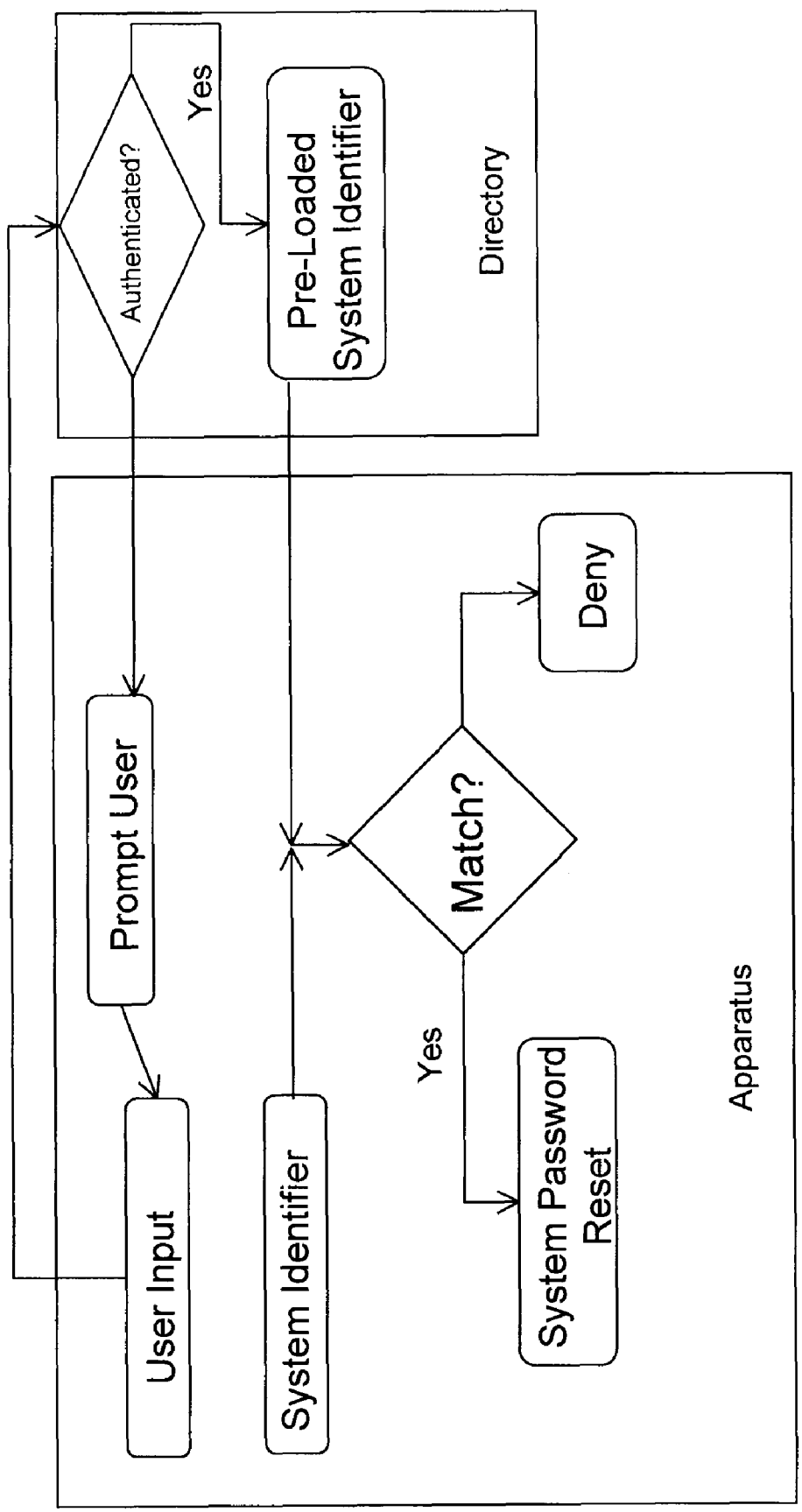
FIG. 2 illustrates password reset according to another embodiment of the invention.

As mentioned above, the present invention relates to a method for method or system which is able to control access to a new computer user password reset. The system is preferably preloaded with a random password that does not need to be known by anyone. There are two main situations in which this method will be used. The first situation involves a locally managed password and account where the user does not log in to a domain. The second situation involves remote management, where the user logs in to a domain. This method is implemented using a password that is set to a random value, along with an LDAP (Lightweight Directory Access Protocol) account activation that is controlled by the Information Technology (IT) organization. This arrangement allows the IT organization to control when the user can first access the system. The method of the instant invention is able to deal with both situations successfully.

The first situation, as discussed above, involves using password reset in a locally administered mode. In this mode, the first steps taken will be to generate and set a random password on the system when it is manufactured or configured for shipment to an end user. The password is subsequently discarded by the configuration infrastructure, but retained on the system. In addition to setting a random password, a unique value will be created. This value will be signed (encrypted) using half of a generated key pair, and then inserted into a secured location on the system when the system's image is installed.

This secure location can include one of many locations on the system, such as TCPA (Trusted Computing Platform Alliance) chip or module, encrypted on the hard drive, or in a secured area in BIOS, for example. The other half of the generated key pair is shipped to the intended end user.

This unique value will preferably be made up of a combination of one or several components. The components could be derived from information intrinsic to that specific system, such as machine-type & model and/or serial number data, or a combination of such pieces of data. The component could also be the system's BIOS's public key, or a transformation of the key. The key is attained through a process used to validate the BIOS. Before the system is shipped to the end user, the BIOS data is hashed, resulting in a hash number and a public/private key pair. The private key is used to encrypt the hash of the BIOS, so that the hash number cannot be altered. This hash is saved on the system as the BIOS signature. The system is shipped to the end user, and as the system is powered on and verified, the BIOS is rehashed. The BIOS public key is used to decrypt the hash signature, and the two hash values are compared to determine if the BIOS has been altered. Other BIOS-supplied or system characteristics can be used as, or in combination with, the components that compose the unique value.

When the system is powered up for the first time, the system would combine the components (for example, the intrinsic component and the BIOS-supplied component) as necessary to recreate the original unique value. The system would then query the recipient for the second half of the generated key pair, retrieve the encrypted value from the secured area, and decrypt it using the second half of the key pair. If the newly-generated value and the decrypted value match, the user would be allowed to change the password.

The second situation, as discussed above, involves using the password reset in a centrally or remotely administered mode, such as LDAP, Active Directory, Kerberos or another similar environment. In this mode, the first steps taken will be to generate and set a random password on the system when it is manufactured or configured for shipment to an end user. The password is subsequently discarded by the configuration infrastructure, but retained on the system. The system will be prepared with a secure Operating System that can connect to the directory. While the system is being configured, a unique value will be generated using information intrinsic to the system, such as machine-type and model and/or serial number. The intrinsic information is hashed and stored with the user's information in the directory.

When the system is powered up for the first time, the system will offer the user the opportunity to reset the password. When the user selects to reset the password, the secure Operating System will boot and connect to the directory. The user will be challenged to authenticate themselves to the directory.

If the user is able to successfully authenticate to the directory, the secure OS then identifies and authenticates the system to the directory by comparing a hash of its intrinsic information against the corresponding information stored in the directory. If the two hashes match, the secure Operating System permits the user to reset their password on the system.

It is to be understood that the present invention, in accordance with at least one presently preferred embodiment, includes elements which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
   an arrangement for generating a unique system identifier in response to power-up of the apparatus;
   an arrangement for accepting user input for accessing a pre-loaded unique system identifier;
   an arrangement for comparing the pre-loaded unique system identifier and the unique system identifier generated in response to power-up of the apparatus; and
   an arrangement for permitting a system password reset upon a match involving the pre-loaded unique system identifier and the unique system identifier generated in response to power-up of the apparatus.

2. The apparatus according to claim 1, wherein the pre-loaded unique system identifier comprises a unique value generated during manufacturing from one or more sources of apparatus specific information, and wherein the unique value further comprises a unique value encrypted using a key pair and stored in a secure location of the apparatus.

3. The apparatus according to claim 2, wherein said arrangement for generating a unique system identifier in response to power-up of the apparatus is configured to generate an unencrypted unique system identifier using the one or more sources of apparatus specific information utilized to generate the pre-loaded unique system identifier.

4. The apparatus according to claim 2, wherein said user input for accessing a pre-loaded unique system identifier comprises a user input member of the key pair, and wherein the arrangement for accepting user input for accessing a pre-loaded unique system identifier is configured to utilize the user input member of the key pair to decrypt the pre-loaded unique system identifier.

5. The apparatus according to claim 4, wherein said arrangement for comparing the pre-loaded unique system identifier and the unique system identifier generated in response to power-up of the apparatus is configured to compare the pre-loaded unique system identifier and the unique system identifier generated in response to power-up of the apparatus in response to the pre-loaded unique system identifier being decrypted.

6. The apparatus according to claim 1, wherein the pre-loaded unique system identifier comprises a unique value generated during manufacturing stored in a remote directory.

7. The apparatus according to claim 6, wherein said user input for accessing a pre-loaded unique system identifier comprises a user input for authentication to the directory.

8. The apparatus according to claim 7, wherein said arrangement for comparing the pre-loaded unique system identifier and the unique system identifier generated in response to power-up of the apparatus is configured to provide the unique system identifier generated in response to power-up of the apparatus for comparison with the pre-loaded unique system identifier stored in the directory in response to the user being authenticated at the directory.

9. A method comprising:
   generating a unique system identifier in response to power-up of an apparatus;
   accepting user input for accessing a pre-loaded unique system identifier;
   comparing the pre-loaded unique system identifier and the unique system identifier generated in response to power-up of the apparatus; and
   permitting a system password reset upon a match involving the pre-loaded unique system identifier and the unique system identifier generated in response to power-up of the apparatus.

10. The method according to claim 9, wherein the pre-loaded unique system identifier comprises a unique value generated during manufacturing from one or more sources of apparatus specific information, and wherein the unique value further comprises a unique value encrypted using a key pair and stored in a secure location of the apparatus.

11. The method according to claim 10, wherein said generating a unique system identifier in response to power-up of the apparatus further comprises generating an unencrypted unique system identifier using the one or more sources of apparatus specific information utilized to generate the pre-loaded unique system identifier.

12. The method according to claim 10, wherein said user input for accessing a pre-loaded unique system identifier comprises a user input member of the key pair, and wherein said accepting user input for accessing a pre-loaded unique system identifier further comprises utilizing the user input member of the key pair to decrypt the pre-loaded unique system identifier.

13. The method according to claim 9, wherein the pre-loaded unique system identifier comprises a unique value generated during manufacturing stored in a remote directory.

14. The method according to claim 13, wherein said user input for accessing a pre-loaded unique system identifier comprises a user input for authentication to the directory.

15. The method according to claim 14, wherein said comparing the pre-loaded unique system identifier and the unique system identifier generated in response to power-up of the apparatus further comprises providing the unique system identifier generated in response to power-up of the apparatus for comparison with the pre-loaded unique system identifier stored in the directory in response to the user being authenticated at the directory.

16. A program storage device readable by machine, tangibly embodying a program of instructions executable by the machine to perform acts, said acts comprising:
  generating a unique system identifier in response to power-up of an apparatus;
  accepting user input for accessing a pre-loaded unique system identifier;
  comparing the pre-loaded unique system identifier and the unique system identifier generated in response to power-up of the apparatus; and
  permitting a system password reset upon a match involving the pre-loaded unique system identifier and the unique system identifier generated in response to power-up of the apparatus.

17. The program storage device according to claim 16, wherein the pre-loaded unique system identifier comprises a unique value generated during manufacturing from one or more sources of apparatus specific information, and wherein the unique value further comprises a unique value encrypted using a key pair and stored in a secure location of the apparatus.

18. The program storage device according to claim 17, wherein said generating a unique system identifier in response to power-up of the apparatus further comprises generating an unencrypted unique system identifier using the one or more sources of apparatus specific information utilized to generate the pre-loaded unique system identifier.

19. The program storage device according to claim 17, wherein said user input for accessing a pre-loaded unique system identifier comprises a user input member of the key pair, and wherein said accepting user input for accessing a pre-loaded unique system identifier further comprises utilizing the user input member of the key pair to decrypt the pre-loaded unique system identifier.

* * * * *